(12) United States Patent
Ryhänen et al.

(10) Patent No.: US 9,519,857 B2
(45) Date of Patent: Dec. 13, 2016

(54) APPARATUS AND METHOD FOR SENSING CHARACTERIZING FEATURES OF A DEFORMABLE STRUCTURE

(75) Inventors: Tapani Ryhänen, Cambridge (GB); Zoran Radivojevic, Cambridge (GB); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 746 days.

(21) Appl. No.: 12/164,587

(22) Filed: Jun. 30, 2008

(65) Prior Publication Data
US 2009/0326833 A1  Dec. 31, 2009

(51) Int. Cl.
G09G 5/00 (2006.01)
G06N 3/067 (2006.01)
G06F 3/01 (2006.01)

(52) U.S. Cl.
CPC ............ *G06N 3/0675* (2013.01); *G06F 3/014* (2013.01)

(58) Field of Classification Search
CPC .............................. G06F 3/014; G06N 3/0675
USPC ........................................ 345/150, 156–184
See application file for complete search history.

(56) References Cited

U.S. PATENT DOCUMENTS

| | | | |
|---|---|---|---|
| 6,399,939 B1 * | 6/2002 | Sundaresan et al. | 250/231.1 |
| 6,701,296 B1 * | 3/2004 | Kramer et al. | 704/270 |
| 7,411,332 B2 * | 8/2008 | Kornbluh et al. | 310/311 |
| 7,957,554 B1 * | 6/2011 | Silver et al. | 382/103 |
| 7,981,057 B2 * | 7/2011 | Stewart | 600/595 |
| 8,471,822 B2 * | 6/2013 | Lightenberg | 345/173 |
| 2002/0075232 A1 * | 6/2002 | Daum et al. | 345/158 |
| 2003/0184498 A1 * | 10/2003 | Blumberg et al. | 345/1.2 |
| 2005/0013433 A1 | 1/2005 | Ghassabian | |

(Continued)

FOREIGN PATENT DOCUMENTS

| | | |
|---|---|---|
| DE | 19836805 | 2/2000 |
| WO | WO 2007/146769 A2 | 12/2007 |
| WO | WO 2009/065436 | 5/2009 |

OTHER PUBLICATIONS

J. Eklund, et al; "Near-sensor image processing, a VLSI realization", Proceedings of the Eighth Annual IEEE International ASIC Conference and Exhibit, 1995; Sep. 18-22, 1995; pp. 83-86.

(Continued)

*Primary Examiner* — Kumar Patel
*Assistant Examiner* — Insa Sadio
(74) *Attorney, Agent, or Firm* — Alston & Bird LLP

(57) ABSTRACT

An apparatus includes a deformable structure in which a neural network comprising a plurality of deformation sensors, e.g. nanowire sensors, and distributed in-situ processing circuits. The circuits generate a signal characterizing features of the local deformation of the structure and/or a command signal corresponding to the detected deformation. The structure may be a wearable sleeve that conforms to deformations of a user's skin, part of an electronic device, such as a touch sensitive screen, or an object in itself. The apparatus can provide a user interface, wherein a command corresponding to a current shape of the structure is generated and acted upon by a integrated or remote device, or a device for monitoring a user's position or movement e.g. for replication by a robotic device. The apparatus may have machine learning capability to improve the matching of commands with determined shapes of the deformable structure.

32 Claims, 13 Drawing Sheets

(56) References Cited

U.S. PATENT DOCUMENTS

2007/0270199 A1     11/2007  Kim et al.
2008/0067618 A1*     3/2008  Wang et al. .................. 257/415
2008/0096287 A1*     4/2008  Barth ............... G01N 33/54353
                                                          436/518

OTHER PUBLICATIONS

R. Dominguez-Castro, et al.; "A 0.8-μm CMOS two-dimensional programmable mixed-signal focal-plane array processor with on-chip binary imaging and instructions storage"; IEEE Journal of Solid-State Circuits; vol. 32, Issue 7, Jul. 1997; pp. 1013-1026.
Supplemental European Search Report and Opinion for Application No. 09 772 612.9 date Mar. 5, 2014.
International Search Report and Written Opinion for Application No. PCT/FI2009/050523 dated Oct. 7, 2009.
European Office Action for Application No. 09 772 612.9 dated Mar. 19, 2015.
Office Action for European Application No. 097726129.9 dated Feb. 24, 2016, 5 pages.

\* cited by examiner

APPARATUS AND METHOD FOR SENSING CHARACTERIZING FEATURES OF A DEFORMABLE STRUCTURE

TECHNICAL FIELD

The invention relates to an apparatus comprising an arrangement for sensing its deformation.

BACKGROUND OF THE INVENTION

Recently, there has been a great deal of interest in flexible electronic devices, in particular, wearable electronic devices. Such devices may be capable of detecting the position and or motion of part of the body of a user, thereby permitting the device to trace postures or movements, for example in a monitoring application or in a robotic application for replicating the user's movements. Alternatively, or additionally, such position and/or motion detection can be employed in a user interface, permitting a device and/or a second, remote, device to be controlled by the user's movements or gestures.

The computing resources required for such detection depends upon the complexity of the system and the number of degrees of freedom of variations monitored by the device. Where a relatively large number of sensors is used, the processing of the sensor outputs, measurement, tracing and/or reconstruction of the postures or movements may require considerable computing resources and may result in a significant delay in providing appropriate control or feedback, for example, when generating a command signal based on the determined user posture. In addition, the electronic circuitry may become complex, with a relatively large number of interconnections between the sensors and the processor.

Similar considerations may apply to touch-sensitive devices, particularly where a high degree of precision is required.

SUMMARY OF THE INVENTION

An apparatus according to an embodiment of the invention may comprise a deformable structure and a network including a plurality of sensors arranged to monitor deformation of the deformable structure and a plurality of processing circuits configured to generate a signal characterising features of said deformation, based on the output of two or more of said sensors. The processing circuits are distributed amongst said plurality of sensors.

In other words, an apparatus can be provided with a network of deformation sensors and distributed in-situ processing circuits. Such circuits may be arranged to generate a signal characterising features of the local deformation of the structure and/or a command signal corresponding to the detected deformation. For instance, commands may be associated with one or more predetermined shapes of the structure. The structure may be a wearable sleeve that conforms to deformations of a user's skin, part of an electronic device, such as a touch sensitive screen, or an object in itself. The apparatus can provide a user interface, wherein a command corresponding to a current shape of the structure is generated and acted upon by a integrated or remote device, or a device for monitoring a user's position or movement e.g. for replication by a robotic device. The apparatus may have machine learning capability to improve the matching of commands with determined shapes of the deformable structure.

Such an arrangement permits computing resources required to process signals from the plurality of sensors to be integrated and distributed in the sensor network. Such "in-situ" processing permits the use of a relatively simple configuration for monitoring a deformation having several degrees of freedom and/or requiring a high level of precision, when compared with conventional mesh networks based around a centralized processor.

The network may be a neural network.

The distributed processing network may generate one or more output signals that correspond one or more of the shape of the deformable structure, a user posture or changes in the shape of the deformable structure and a user movement. Alternatively, or additionally, a determined posture or movement can be mapped onto a command signal to be acted upon by the apparatus and/or transmitted to a remote electronic device. In another embodiment of the invention, the apparatus may be used to provide a user interface permitting such an electronic device to be controlled using gestures made by a finger, hand or other body part of a user. Such a user interface may provide a highly intuitive control arrangement for applications such as controlling the movement of a cursor on a display, scrolling an image presented on a display and/or movement of a remote apparatus etc. If the network is trained so that the output signal corresponds to a particular posture or gesture, the required computing resources and the time required to respond to a user input may be reduced.

Any of the above mentioned embodiments may include an electronic device, the functionality of which can be adapted according to the detected shape of the deformable material. For instance, the apparatus may be transformable between first and second shapes and the electronic device may be configured to provide access to a first function of the electronic device when the deformable structure has a first one of said predetermined shapes and to provide access to a second function of the electronic device when the deformable structure is in a second one of said predetermined shapes. The first shape may be an "open" shape of the apparatus, in which a number of functions, including telecommunications functions, are made available to a user while, while the apparatus, when in a second "closed" shape, permits a user to access only a limited set of non-telecommunications functions.

The deformable structure may be configured to be worn over a body part. For instance, the deformable structure may be a sleeve of stretchable material configured to fit over a joint, such as a finger or wrist, or other part of a body.

In any of the above embodiments, the spatial distribution of the sensors may be concentrated in one or more areas of the deformable structure. Such a distribution may permit relatively high resolution monitoring of selected regions of the deformable structure. For instance, the regions may be those in which a relatively high degree of deformation is expected. In such a case, the concentration of the sensors in such a region permits the computational resources to be utilized more effectively.

In any of the above embodiments, the sensors may include piezoelectric material. The piezoelectric material may be provided in the form of a plurality of nanowires. Such nanowires may be aligned along a common direction. Alternatively, or additionally, the sensors may include a material that changes its resistivity when stretched. Where both types of sensors are provided, both stretching and flexure of the deformable structure can be detected.

In any of the above embodiments, the sensors may have a plurality of sensing elements, wherein each sensing element is configured to monitor stretching and flexure of at least part of the deformable structure. For example, first and second ones of said plurality of sensing elements may be arranged to monitor said stretching along first and second directions respectively, wherein the first direction is different from the second direction.

One or more of the above apparatuses may be provided as part of a mobile telephone, for example, as part of its user interface. The deformable structure may form the body of the mobile telephone.

One or more of the above apparatuses may be provided in a foldable electronic device. For example, the deformable structure may be provided within, or even form, the hinge of such a foldable device. The foldable device may be an electronic telephone.

One or more of the above apparatuses may be provided in a portable computing device.

One or more of the above apparatuses may be provided in an electronic device where said deformable structure forms part of a touch sensitive display.

A system may include one of the above apparatuses together with a second, remote apparatus configured to receive said signal from the apparatus. The second apparatus may be arranged to be controlled according to the signal received from said first apparatus and/or to replicate a posture or movement corresponding to the deformation of said at least part of the deformable structure.

A method according to an embodiment of the invention may include obtaining a plurality of measurements of deformations from a plurality of respective sensors distributed within a deformable structure and generating a signal identifying one or more features of said deformation based on two or more of said measurements, wherein said generation of the signal includes processing said two or more measurements using a plurality of processing circuits distributed amongst said sensors.

The generated signal may be compared with previous signals to determine time-based changes in a shape of said deformable structure. Such time-based changes may then be compared with reference data to identify a corresponding movement or command. Alternatively, or additionally, the generated signal may be compared with reference data in order to identify said one or more features.

Any of the above methods may include mapping a command onto said generated signal or onto the result of any comparison with reference data.

Where reference data is used, the method can include compiling said reference data based on a plurality of shapes of the deformable structure or on a plurality of sets of time-based changes in the shape of the deformable structure. Optionally, the method may also include updating the reference data according to measurements and/or comparisons made in operation.

Any of the above methods may include adjusting a set of functions available on a device according to said generated signal or the result of any comparison with reference data.

Any of the above methods may include transmitting to a remote device a signal corresponding to any one of a shape of the deformable structure, time-based changes in the shape of the deformable structure, a posture of a user manipulating the deformable structure, a movement of such a user and a command corresponding to a shape or to time-based changes. Optionally, the remote device may execute a received command or, alternatively, map a command onto the received signal and then execute the mapped command. Such methods may include causing the remote device to replicate a shape of the deformable structure, time-based changes in the shape of the deformable structure, at least part of a posture of a user or a movement of a user.

DETAILED DESCRIPTION

Figure 1A:
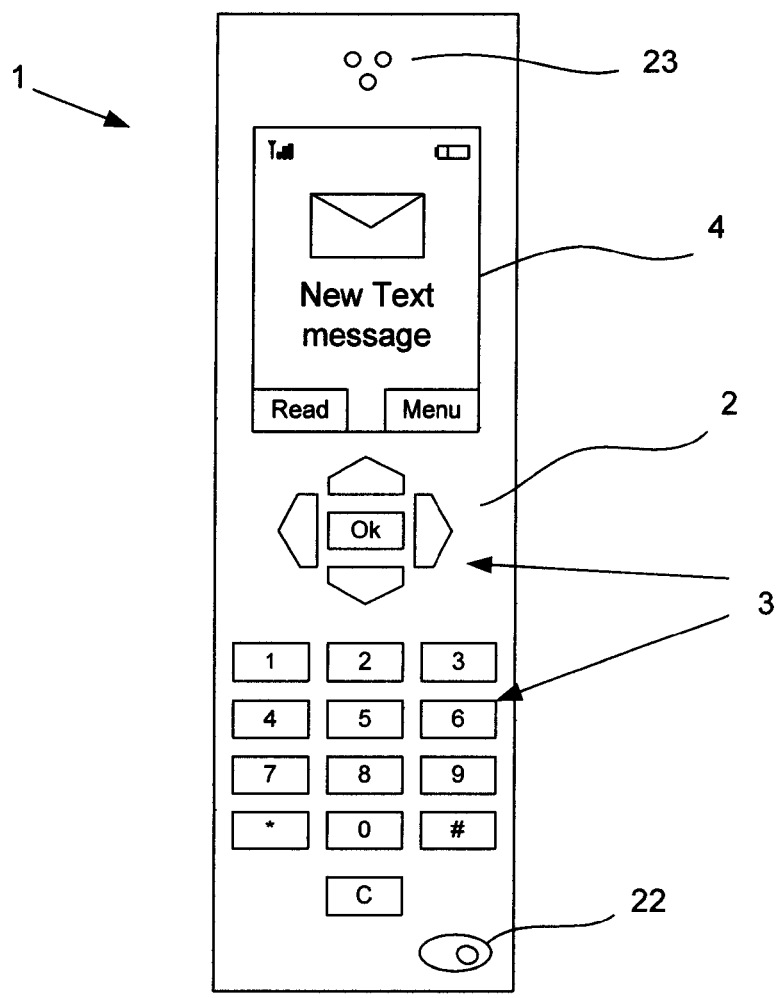
FIGS. 1a and 1b depict an apparatus according to a first embodiment of the invention, in first and second configurations respectively.
Figure 1B:
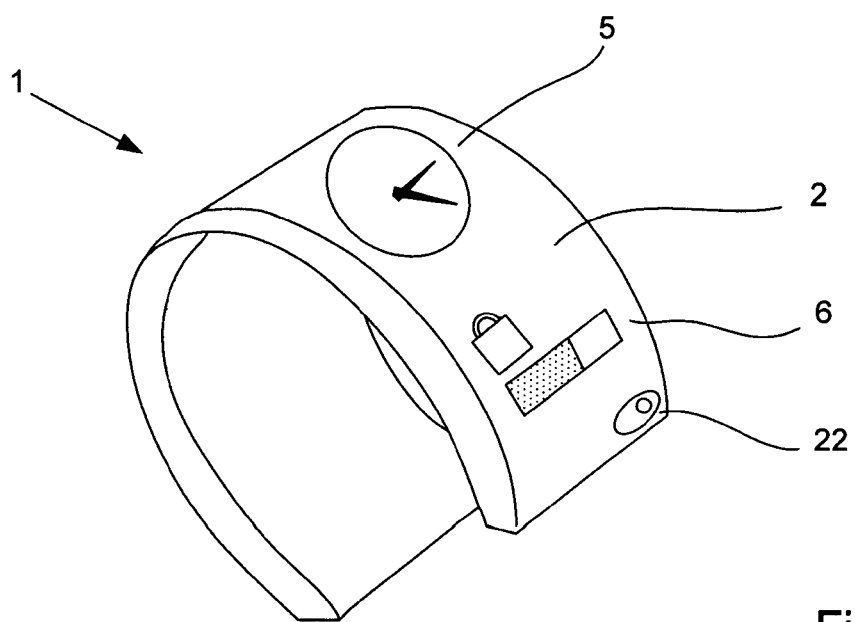

FIGS. 1a and 1b depict an apparatus 1 according to a first embodiment of the invention. The apparatus 1 is a transformable structure comprising an electronic device mounted on a flexible substrate that can be arranged in two or more configurations. Two example configurations are shown in FIGS. 1a and 1b.

Examples of materials suitable for forming the transformable structure include silicone rubber, composite rubber and elastomeric materials, which can provide a substrate for the integration of soft electronic parts. The components of the electronic device may include stretchable thin film coatings of a material such as gold or another metal, deposited directly on the substrate, or nano wire coatings, such as carbon nanotubes, metallic flakes or metal coated microfibers.

The apparatus 1 includes at least one surface 2 arranged to receive user input. In this particular example, the surface 2 is a touch-sensitive display and the apparatus 1 provides different functionalities to a user according to its configuration. In the "open" configuration shown in FIG. 1a, the apparatus 1 is arranged to provide the functions of a mobile telephone and the surface 2 is used to display touch keys 3 for receiving user input and a display region 4 for presenting information to a user. In the "closed" configuration of FIG. 1b, the mobile telephone functionality is not active. The apparatus 1 is arranged to be worn on a user's wrist and the surface 2 is used to provide other functions, such as a clock 5 and a lock 6.

The apparatus 1 is arranged to determine and characterize its configuration using local measurements of strain and/or flexure from a plurality of detection modules. An example of a detection module 7a is shown in FIG. 2.

The detection module 7a, in this particular example, includes a sensor 8 comprising two or more sensing elements 8a, 8b. The sensing elements 8a, 8b are arranged to monitor stretching along respective first and second directions, simultaneously. In this embodiment, the first and second directions are perpendicular to one another. In other embodiments of the invention, the sensor 8 may include a single sensing element or more than two sensing elements. Moreover, the directions along which the sensing elements 8a, 8b detect elongation need not be perpendicular to each other.

The output from the sensor 8 is transmitted to one or more of in-situ processing circuits 9a. The output from the one or more processing circuits 9a may, if required, be directed to one or more further processing circuit 10a and/or an application processor (not shown) via a bus 11.

Figure 2:
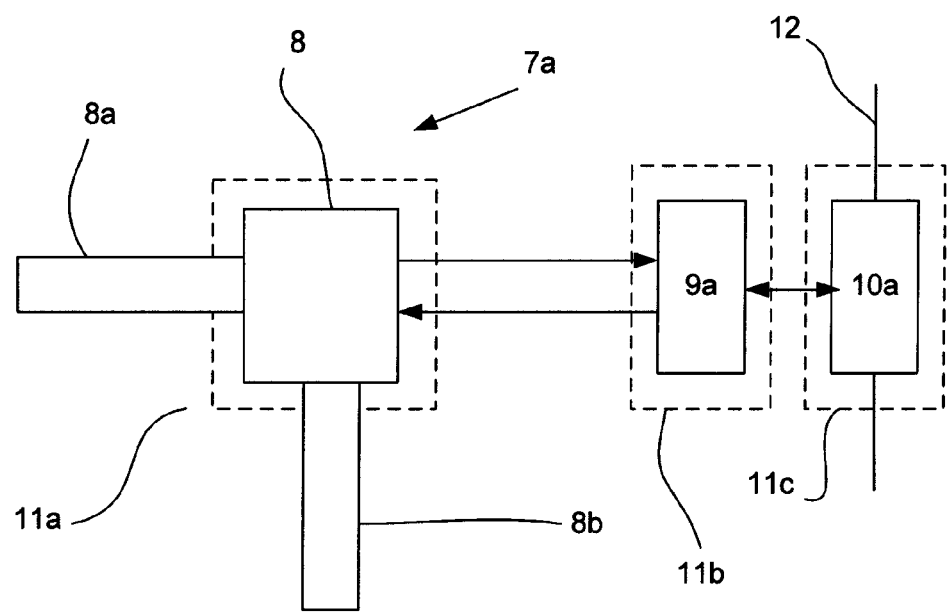
FIG. 2 is a plan view of a detection module of the apparatus of FIGS. 1a to 1b.

As shown in FIG. 2, part of the sensor 8 and the processing circuits 9a, 10a may be mounted on rigid substrates 12a, 12b, 12c. However, the sensing elements 8a, 8b are arranged so that they can stretch and bend to conform with deformations of the apparatus 1. Such a combination of rigid and soft structures, referred to hereinafter as a "semi-rigid" architecture, can be realized by laminating suitable materials for component of the sensor 8 and processing circuits 9a, 10a onto the substrate of the transformable structure. Suitable materials for use in such an architecture can include thin film metal electrodes, piezoelectric ceramic material (zinc-oxide (ZnO), lead-zirconate-titanate (PZT), polyvinylidene fluoride (PVDF), elastomeric composites with appropriate sensing properties, suitable nano-structured inorganic materials (highly aligned ZnO nanomaterials) and so on.

Figure 3:
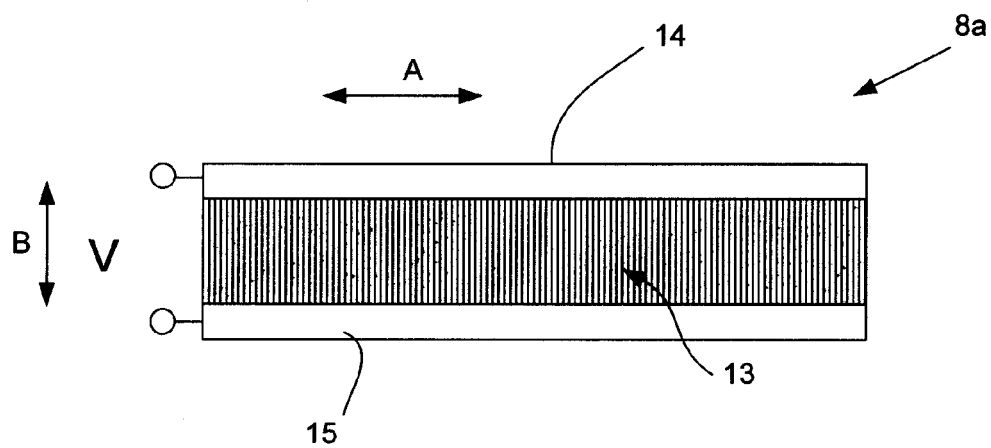
FIG. 3 is a cross-sectional view of sensor of the detection module of FIG. 2.
Figure 4:
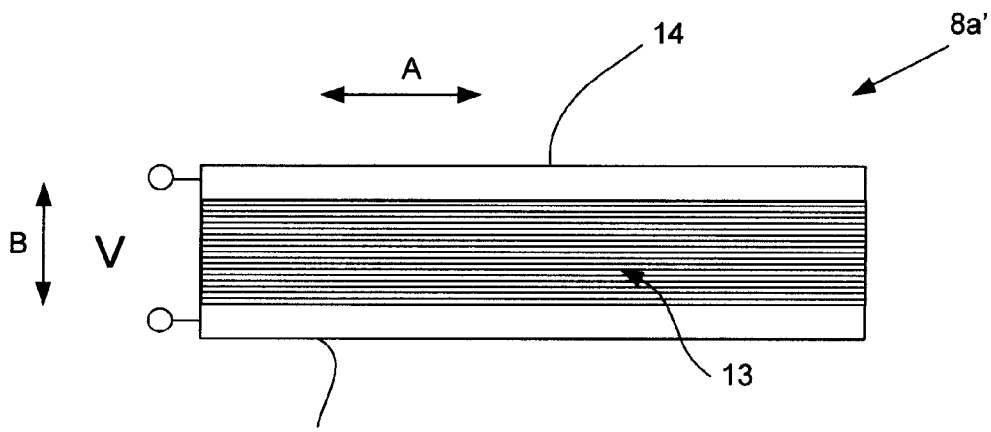
FIG. 4 is a cross-sectional view of an alternative sensor that could be used in the detection module of FIG. 2.

The configurations of two example sensing elements 8a, 8a' are shown in FIGS. 3 and 4. In both example configurations, the sensing element 8a comprises a layer of sensing material 13, with first and second electrodes 14, 15 positioned on either side thereof.

In the example of FIG. 3, the sensing layer 13 includes a material having an electrical property, such as charge generation, resistance or capacitance, that changes in response to in-plane and out-of-plane deformations, in other words, when stretched and/or flexed. Depending on the configuration of the detection module 7a and type of sensing material employed, the detection module 7a may detect flexure and/or two-dimensional stretching, or a combination of the two. For example, the sensor 8 may monitor one or more of localised charges, that is, voltages (V), generated by the sensing elements 8a, 8a', 8b in response to stretching and/or flexure, resistance (R) changes, where the sensing material comprises a sensitive piezoelectric, electrostrictive, ferroelectric or similar materials or are simple elongation sensitive resistors, or where the sensing material is configured to change its capacitance in response to stretching and/or flexure, localised capacitance changes. These sensing techniques may be used and, if required, combined, in order to monitor complex deformations in three dimensions.

In this particular embodiment, the sensing layer 13 is a flexible and stretchable film, formed from a material such as silicon rubber and comprising an array of highly aligned piezoelectric nanowires. The nanowires are formed of a suitable material, such as piezoelectric (ZnO and/or $BaTiO_3$) or resistive (CNT) nano wires grown or dispersed on the second electrode 15. The first electrode 14 is laminated onto the sensing layer 13.

The nanowires are aligned along a predetermined direction. In the examples shown in FIGS. 3 and 4, the nanowires are aligned perpendicularly and parallel to the electrodes 14, 15 respectively. However, in other embodiments, the nanowires may be aligned along another direction, for example, so that they extend diagonally between the first and second electrodes 14, 15.

The first and second electrodes 14, 15 are flexible and stretchable. The first electrode 14 may be formed of a material such as carbon (carbon black) or another material that changes its inherent resistance in accordance with, and/or proportionally to, its elongation. In this manner, the first electrode 14 can perform two functions, reading signals from the sensing layer 13 undergoing deformation and serving as a simple one-dimensional elongation sensor.

Meanwhile, the second electrode 15 is formed of a material such as gold, silver, copper or indium tin oxide (ITO), the resistance of which does not change significantly when flexed or elongated. The electrodes 14, 15 may be thin metallic films, that is, films having a sub-micrometer thickness, of gold, silver or copper. Such films may, if required, include micro-cracks in order to increase elasticity. Alternatively, the electrodes 14, 15 may be formed of a conductive composite elastic layer in which conductive particles are embedded in an elastic polymeric matrix. The embedded particles may be micro-sized metallic particles, nano-sized carbon fullerenes ("bucky balls"), carbon nano-fibres, or microscopic metallic fibres, metallic flakes or metal covered fibre networks. Such elastic composites or thin films on elastomers may be elongated, reversibly, by up to 50%, while remaining electrically conductive. Such a level of reversible stretchability can accommodate the deformation of the apparatus 1 required to move between the open and closed configurations of FIGS. 1a and 1b.

In some embodiments of the invention, the functional components such as the sensors 8, processing circuits 9a, 10a, bus 11 and the connections therebetween can be realized by using soft and/or rigid materials on elastic and stretchable substrates 12a-12c. Such functional components are directly deposited on a stretchable substrate forming the apparatus 1, in a so-called "semi-rigid" form of the overall system. Deposition of the functional components can be realized for example, by using a printing technique. For example, polymer sensors may be provided on the apparatus 1 using ink-jet printing to deposit the sensors 8 and circuitry 9, 10, 11. In other embodiments of the invention, the sensors 8 and other components are prefabricated and embedded into the substrate. In either case, an insulating layer of deformable material may be deposited on the substrate, in order to encapsulate the sensors 8 and circuitry 9, 10, 11, to avoid interference.

The example sensing elements 8a, 8a' can detect localised stretching and flexing of the apparatus 1 as follows. When the substrate of the apparatus 1 is stretched, along direction A, shown in FIGS. 3 and 4, the first electrode 14 will lengthen, causing a change in its resistance that corresponds to the change in its length. Although the second electrode 15 also lengthens, its resistance is substantially unchanged. If the structure is flexed along direction B in FIGS. 3 and 4, the first and second electrodes 14, 15 and the nanowires will bend. The nanowires will produce a voltage that is proportional to a bending angle/surface curvature of the sensing layer 13. The polarity of the voltage can be used to indicate whether the sensing layer 13 is being flexed in a concave or convex shape. In this manner, the detection module 7a can be used to generate an output signal indicating elongation along direction A as well as local flexing/bending of the apparatus 1.

Figure 5:
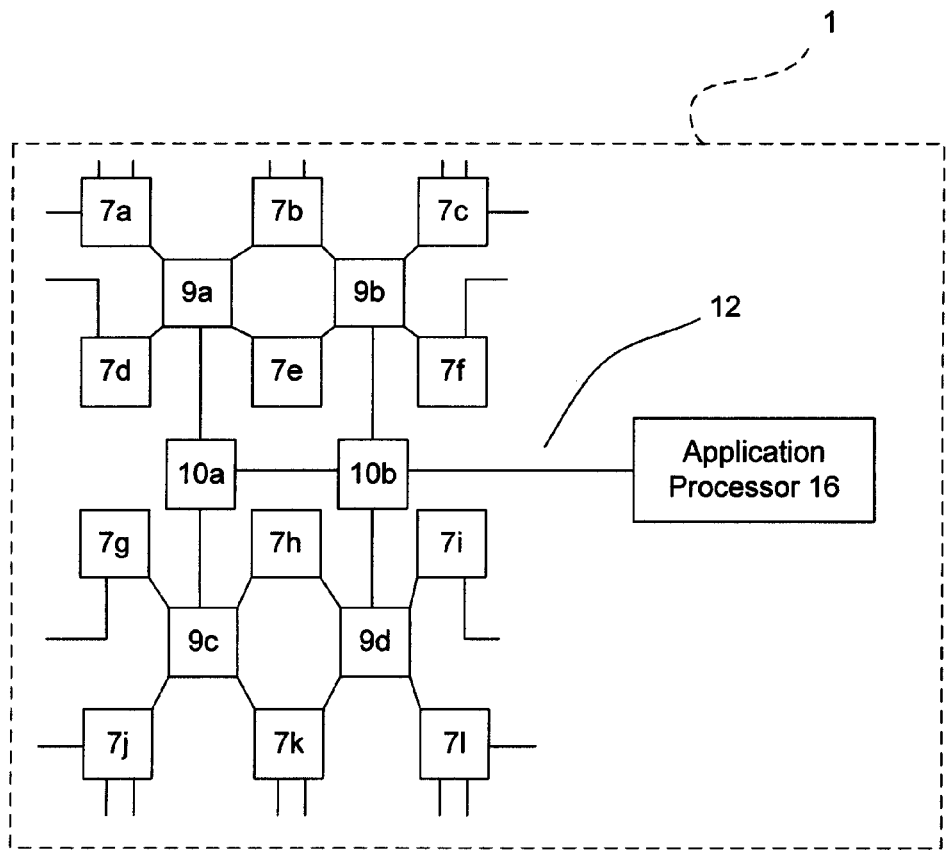
FIG. 5 depicts a general configuration of part of an array of detection modules in the apparatus shown in FIGS. 1a and 1b.

In this particular embodiment of the invention, a network of such detection modules 7a-7l and in-situ processing circuits 9a-9d, 10a, 10b is distributed within the apparatus 1, as shown in the partial view of FIG. 5. At least some of the processing circuits 9a-9d, 10a, 10b comprise computational capabilities, as will be explained later. In this particular embodiment, at least some of the processing circuits 10a, 10b are connected to the application processor 16 via the bus 11.

Figure 6:
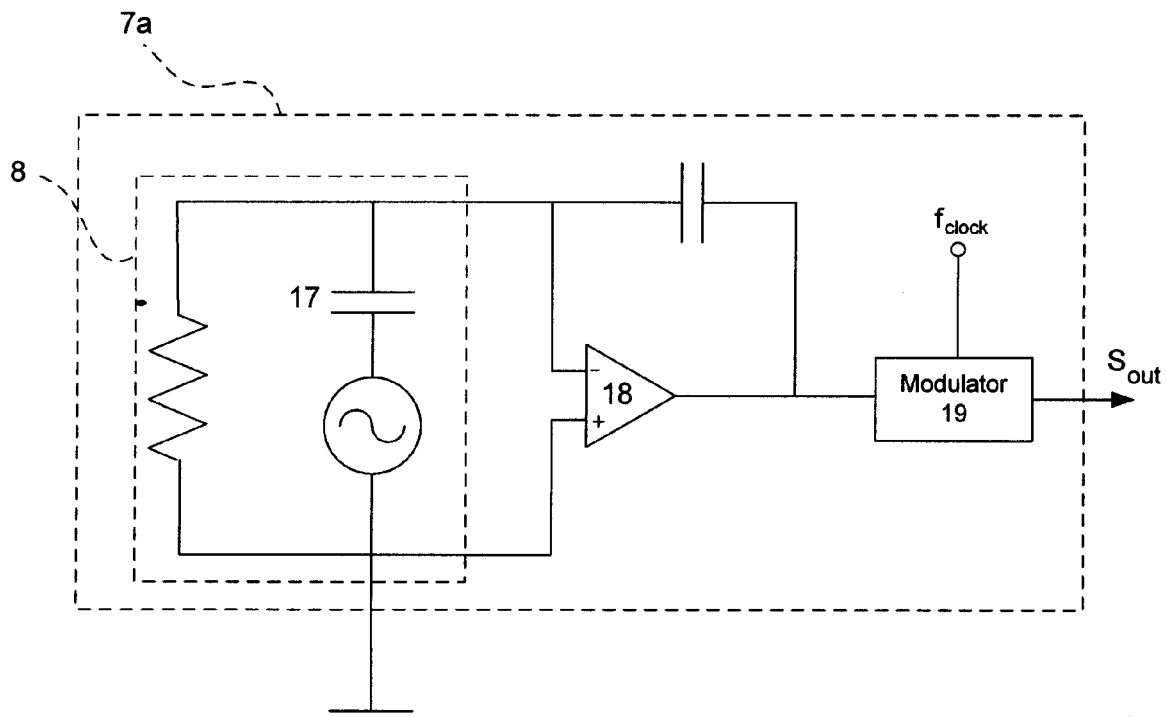
FIG. 6 depicts an equivalent circuit of a detection module in the apparatus of FIGS. 1a and 1b.

FIG. 6 depicts an equivalent circuit for a part of a detection module 7a that produces and conditions a signal $S_{out}$ having a frequency corresponding to the voltage across the sensing layer 13 of one or more sensor elements 8a, 8b.

In this particular example, the detection modules 7a-7l are configured as "spiking neurons". In other words, the detection modules 7a-7l are configured to transmit an output to the processing circuits 9a-9d when the voltages generated by the nanowires of the sensing layer 13 exceed a predetermined threshold. The detection module 7a therefore includes an integrator 17, which integrates the voltage across the sensing layer 13 or layers. When the voltage across the capacitor 17 exceeds the predetermined threshold, the integrator 17 is discharged and a pulse is generated. In this particular embodiment, the integrator 17 is the sensor 8 itself. In other words, the intrinsic capacitance of the sensor 8 is used and the piezoelectric voltage is used as a variable ground potential therefor.

However, in other embodiments, the integrator may be provided in the form of a separate capacitor.

The detection module 7a of FIG. 6 also provides components for conditioning the signal $S_{out}$ produced by the sensor 8. The detection module 7a comprises a comparator, in the form of a charge amplifier 18 with high input impedance, provided with a negative feedback path, and a Sigma-Delta modulator 19 to convert the signal $S_{out}$ into a pulse modulated signal.

Signals between and from the detection modules 7a-7l can be transmitted within the apparatus 1 in the form of pulse or spike coded signals, to reduce or remove interference from external electromagnetic fields or any effects from environmental factors, such as temperature variations. For example, the processing circuit 9a-9d could be configured to transmit signals using one of pulse width modulation (PWM), pulse density modulation (PDM), pulse train frequency modulation or spike code modulation. However, various alternative signal coding methods could be used. The coding scheme may be configured so that there are time-slots for sending data from the detection modules 7a-7l to processing circuits 9a-9d and, in turn from the processing circuits 9a-9d to processing circuits 10a, 10b and so on. Such a scheme may avoid the need for an address-based x-y read-out structure, permitting the use of a simpler network configuration with fewer interconnections.

Although FIG. 6 shows the signal conditioning components 18, 19 as part of a detection module 7a, in other embodiments of the invention, such signal conditioning may be instead be performed by at least some of the processing circuits 9a, 9d. Alternatively, signal conditioning components 18, 19 may be provided in both the detection modules 7a and the processing circuits 9a.

The detection modules 7a-7l and processing circuits 9a-9d, 10a, 10b provide a neural network that can classify and recognize the configuration of the apparatus 1. The neural network may be configured to identify a transformation of the apparatus 1 and, if required, to determine the dynamics of such a transformation.

Figure 7:
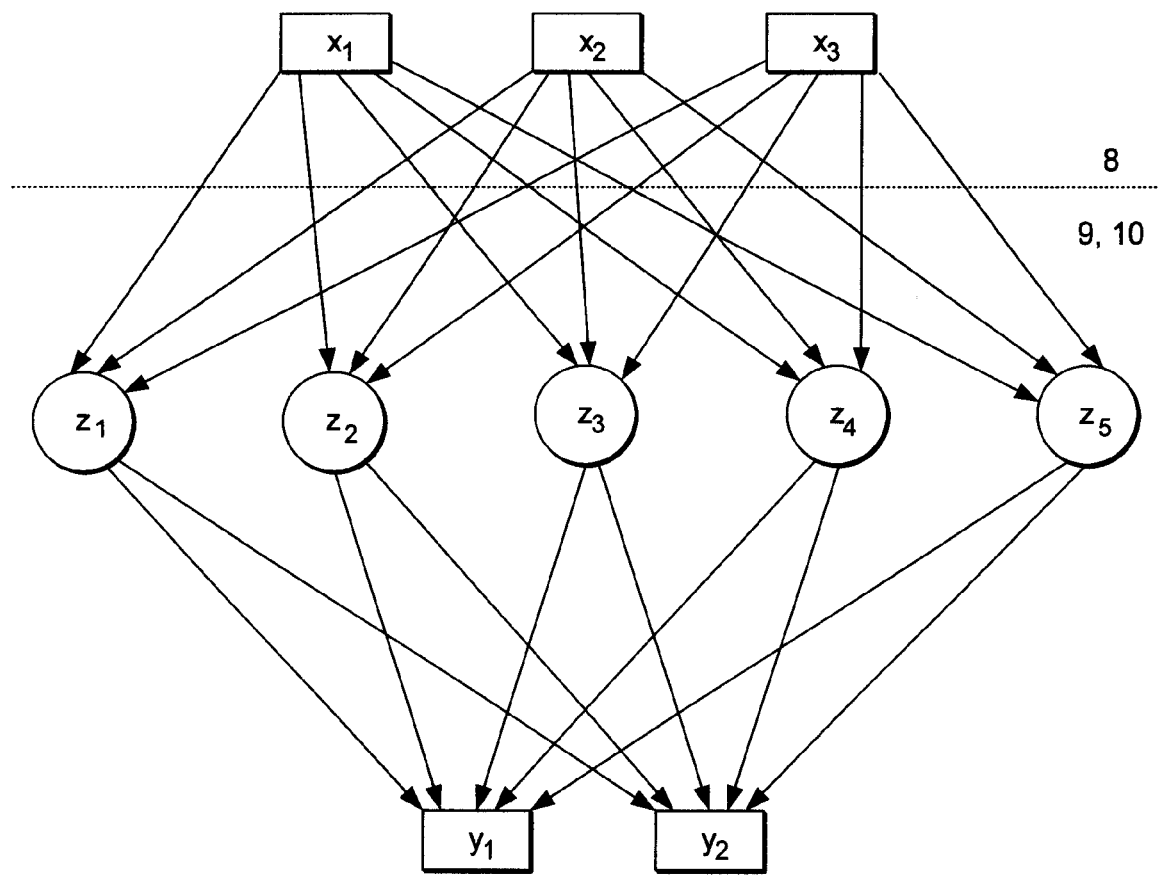
FIG. 7 is a representation of a neural network of the apparatus of FIGS. 1a and 1b.

An example of a deformation characterising procedure that could be performed by the processing circuits 9a-9d, 10a, 10b of such a neural network will now be described, with reference to FIG. 7.

The signals from the sensors 8 are collected, analyzed and further forwarded in modified/simplified form by the in-situ processing circuits 9a-9d, 10a, 10b. The processing is implemented in close proximity to the sensors 8, providing analysis of local deformations. Each processing circuit 9a-9d receives input from at least two sensors.

The local deformations measured by the sensors 8 of n detection modules 7 can be expressed as a vector $\bar{x}_i$ as follows:

$$\bar{x}_i = \begin{Bmatrix} x_{i1} \\ x_{i2} \\ \vdots \\ x_{in} \end{Bmatrix} \quad (1)$$

For the sake of simplicity, the example described below, with reference to FIG. 6, will relate to three local measurements $x_1$, $x_2$, $x_3$, which, in this particular example, are deformation parameters, based on the voltages measured by the sensors 8 respectively.

The processing circuits 9a-9d, 10a, 10b are configured to map the local measurements $x_1$, $x_2$, $x_3$ onto a higher dimensional feature space. In this particular example, the mapping is made using a nonlinear classifier, in the form of a Radial Basis Function (RBF). However, in the apparatus 1, the described processing may be based on any number of available measurements and/or on another suitable classifier as required.

In this example, the RBF classifier is based on a Gaussian kernel function, $$z(\bar{x}, \bar{x}_m) \propto \exp\left(-\frac{\|\bar{x} - \bar{x}_m\|^2}{\sigma_i^2}\right) \quad (2)$$

where $\bar{x}_m$ represents a model vector. The value of $\sigma_i^2$ determines the sharpness of the kernel function. Here, the kernel function can be interpreted as a similarity operator, which indicates how closely the local measurements $x_1$, $x_2$, $x_3$ correspond to the model vector $\bar{x}_m$. In this simplified example, the local measurements $x_1$, $x_2$, $x_3$ are mapped onto a five dimensional feature space, using classifiers $z_1$ to $z_5$.

The classifiers $z_1$ to $z_5$ are then mapped onto a lower dimensional space that has a sufficient number of dimensions to represent and classify at least the major features of a deformation, or non-deformation, of the apparatus 1. In this simplified example, a two-dimensional state space $\{y_1, y_2\}$ is used.

The layer feeding the measurements $x_1$, $x_2$, $x_3$ is referred to as the input layer, the layer calculating the classifiers is the middle layer, and the final layer, which calculates the outputs $\{y_1, y_2\}$, is referred to as the output layer.

In this example case of an RBF network, the outputs are weighted sums of the classifiers $z_1$ to $z_5$ plus an additional bias value $z_{bias}$. In this simplified example, there is one intermediate, or hidden, layer.

In another embodiment, a traditional artificial neural network could be employed, in which a hidden layer and an output layer form weighted sums of the input measurements and calculate a sigmoid function. Alternatively, a cellular neural/non-linear network (CNN) could be used.

The parameters of the neural network may be reprogrammable, in order to allow the processing circuits 9a-9d, 10a, 10b to improve matches between desired and actual outputs. In this manner, the apparatus 1 can continue "learning" to recognize pre-determined configurations, such as three-dimensional shapes, over its lifetime.

Alternatively, the parameters could be derived during development and the learned values permanently configured in the processing circuits 9a-9d, 10a, 10b of the detection modules 7a-7l. Such learning may take place in a supervised manner, by performing a trial and adjusting the parameters to obtain suitable matches between desired and actual outputs. On the other hand, unsupervised learning techniques may be employed, for example, using self-organizing maps (SOM).

Figure 8:
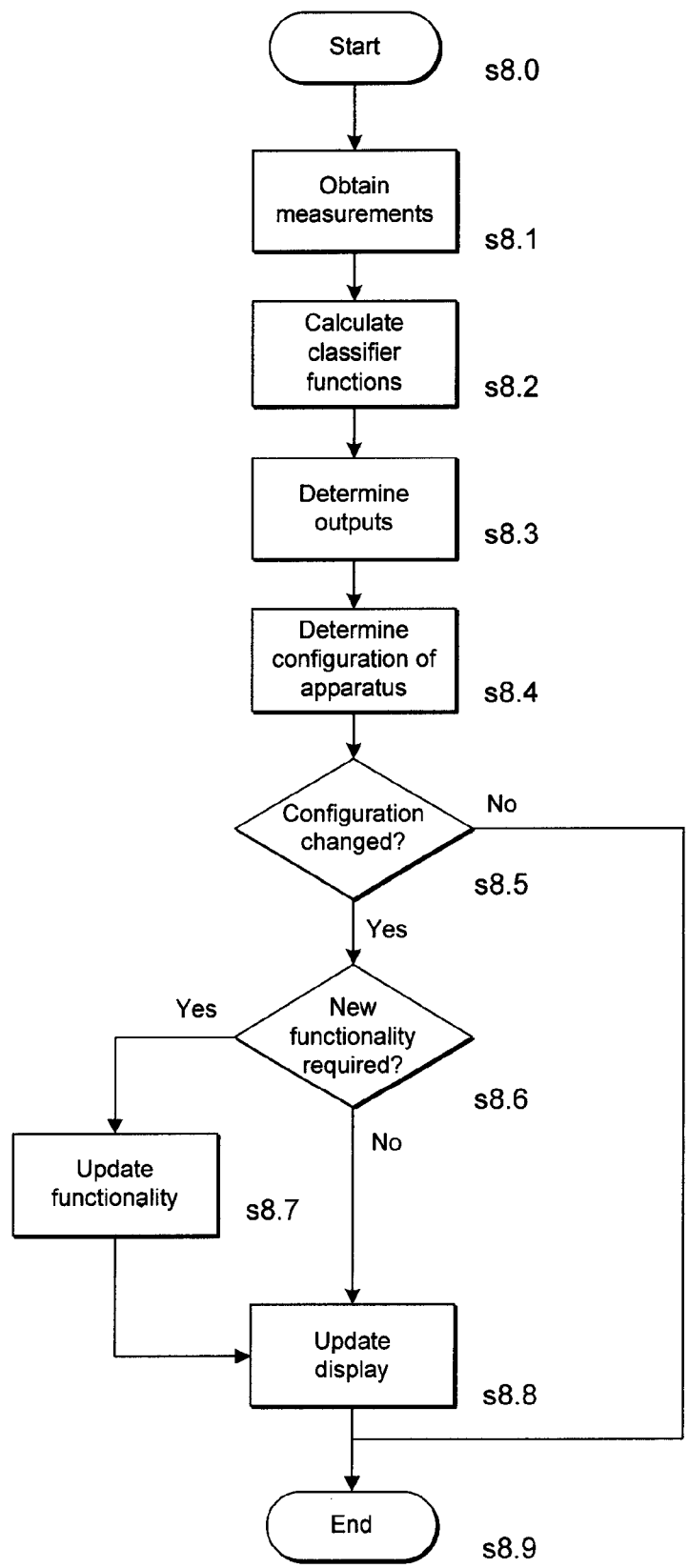
FIG. 8 is a flowchart of a method of operating the apparatus of FIGS. 1a and 1b.

An example of a method for operating the device is depicted in FIG. 8.

Starting at step s8.0, localised measurements $x_1, \ldots x_n$ of the stretching and/or flexure of the apparatus 1 are obtained by the sensors 8 of the detection modules 7a-7l (step s8.1). Classifier functions z are calculated based thereon (step s8.2), in a similar manner to that described above. The classifier functions are then used to calculate outputs $\{y\}$ that characterize at least the major features of the stretching and/or flexure of the apparatus 1 (step s8.3) and are used to determine the configuration of the apparatus 1 (step s8.4). The overall configuration of the apparatus 1 can be determined by a centralized processor, such as the application processor 13 shown in FIG. 5. Alternatively, a local configuration may be determined, by the application processor 13 or by the one or more of the processing circuits 9a-9d, 10a, 10b.

If it is found that the configuration of the apparatus 1 has changed (step s8.5), the application processor 13 determines whether or not the change in configuration requires a change in the functionality to be made available to a user (step s8.6).

For example, if it is determined that the apparatus 1 has been moved into its flat configuration, shown in FIG. 1a, the application processor may activate mobile telephone functionality (step s8.7). Alternatively, if it is determined that a user moved the apparatus 1 into its bent configuration shown in FIG. 1b, the application processor may deactivate the mobile telephone functionality and activate other features, such as a clock (step s8.7). In either case, the application processor 13 may determine whether the configuration parameters satisfy one or more pre-determined conditions based on particular shapes/configurations, trigger/execute an protocol or function at the apparatus 1 and update displayed information accordingly (step s8.8), completing the procedure (step s8.9).

Alternatively, or additionally, the processor 16 may be arranged to transmit a wired or wireless signal to a remote device at step s8.7, in order to guide, steer and/or execute commands and functions at the remote device, such as pointer steering on a personal computer or a display device, browsing through menus and/or selecting the most appropriate icon and executing a protocol associated with a selected menu option, internet browsing applications, controlling home appliances, a TV or other home electronic devices, and so on.

If it is found that a change in functionality is not required (step s8.6), the application processor 16 may make changes to the information, images and/or content displayed on the apparatus 1, such as updating content or changing an area on the apparatus 1 on which it is displayed, in accordance with the determined configuration (step s8.8), for instance, to complete the procedure (step s7.9).

Figure 9:
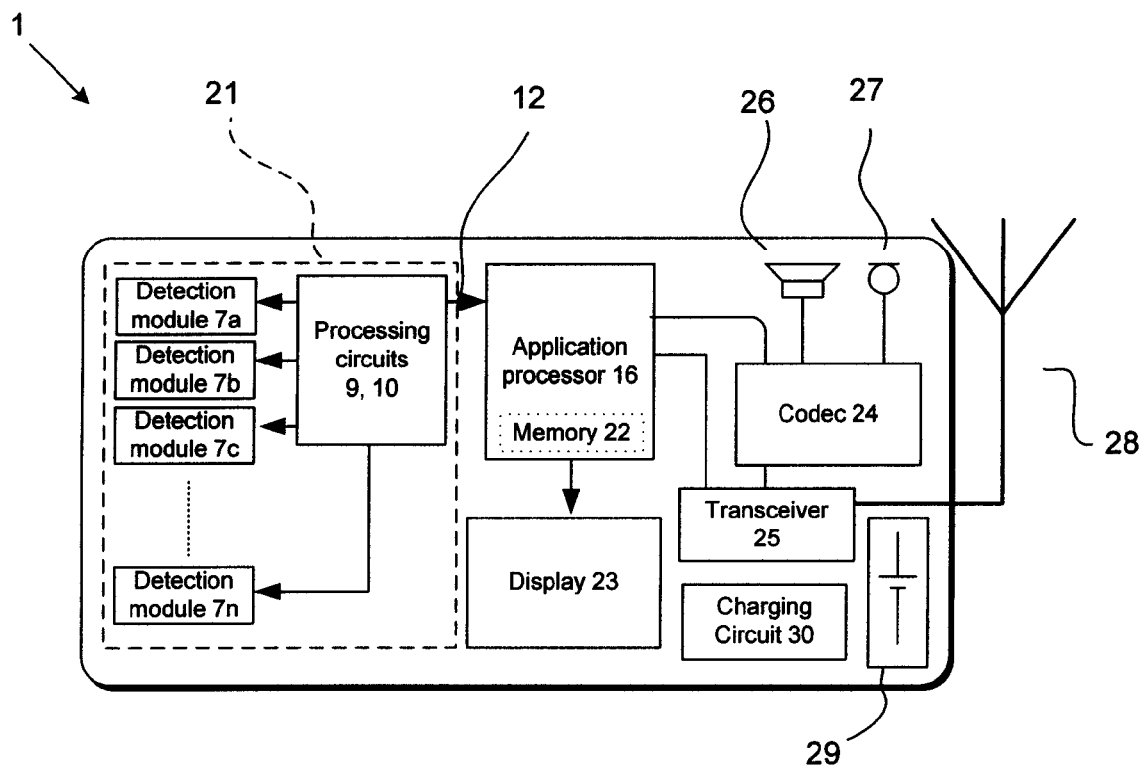
FIG. 9 is a block diagram showing a configuration of part of the apparatus of FIGS. 1a and 1b.

FIG. 9 is a block diagram of the apparatus 1. The detection modules 7a-7l and processing circuits 9, 10 provide a neural network 21. In this particular example, the outputs from the neural network are sent to the application processor 16, which runs software stored in memory 22 in order to perform the relevant determinations and updating functions discussed above in relation to FIG. 8. The application processor 16 can control the presentation of information on a display 23, as well as mobile phone components in the form of a codec 24, transceiver 25, a microphone 26, a speaker 27 and respective amplifiers (not shown). An antenna 28 is provided for transmitting data to, and receiving data from, a base station (not shown). The apparatus 1 can be powered by a rechargeable battery 29, which can be recharged via charging circuit 30.

In addition to reducing the number of interconnects, when compared with conventional x-y readout arrangements, such as cross-bar readout architectures, direct readout architectures and so on, the neural network 21 produces a signal based on the outputs of multiples ones of the detection modules 7. The processing circuits 9, 10 may be relatively simple, when compared with a conventional processor, potentially reducing both the power consumption and the cost of manufacturing the apparatus 1. Moreover, the use of distributed processing can allow the apparatus to react to user input relatively quickly.

Figure 10:
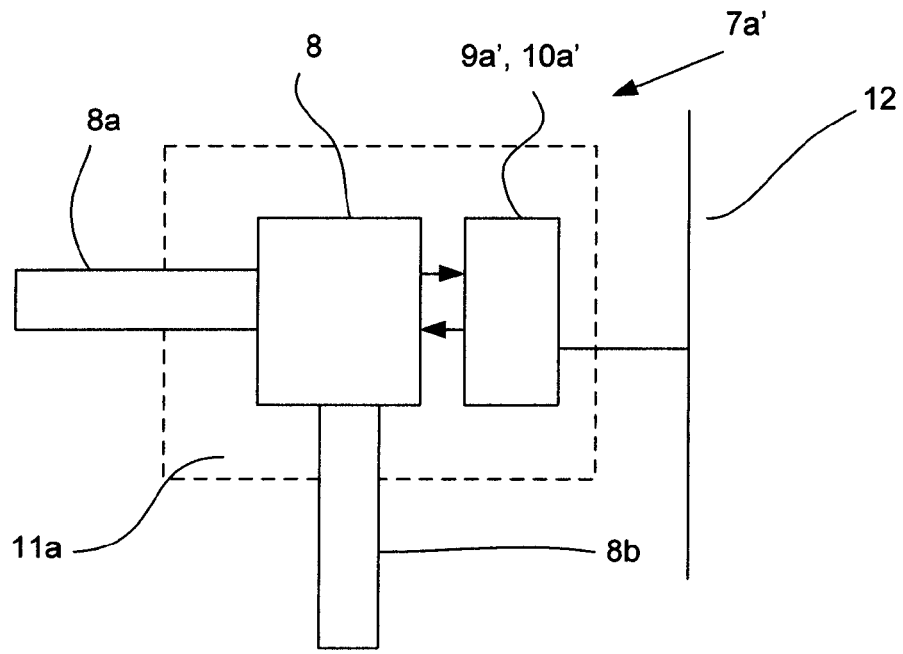
FIG. 10 depicts a general configuration of part of an alternative array of detection modules that could be used in the apparatus of FIGS. 1a and 1b.

In the above described embodiment, the processing circuits 9a-9d, 10a, 10b are provided separately from the detection modules 7a-7l. However, in other embodiments, some or all of the processing circuitry may be provided within one or more of the detection modules. For example, FIG. 10 depicts a detection module 7a' comprising a rigid substrate 12a upon which part of the sensor 8 and processing circuitry 9a'. 10a' are provided, in a similar manner to the "semi-rigid" arrangement described above in relation to FIG. 2. In particular, the sensors 8 can be realized in the form of soft and flexible structures that connect the rigid substrates 12a on which the processing circuitry 9a', 10a' is mounted.

The processing circuitry 9a', 10a' comprises at least an amplifier and an ADC in order to condition the output of the sensor 8. The output can then be further processed by the processing circuitry 9a', 10a' and/or transmitted to another processing circuit or a processor 16 via bus 12.

Figure 11:
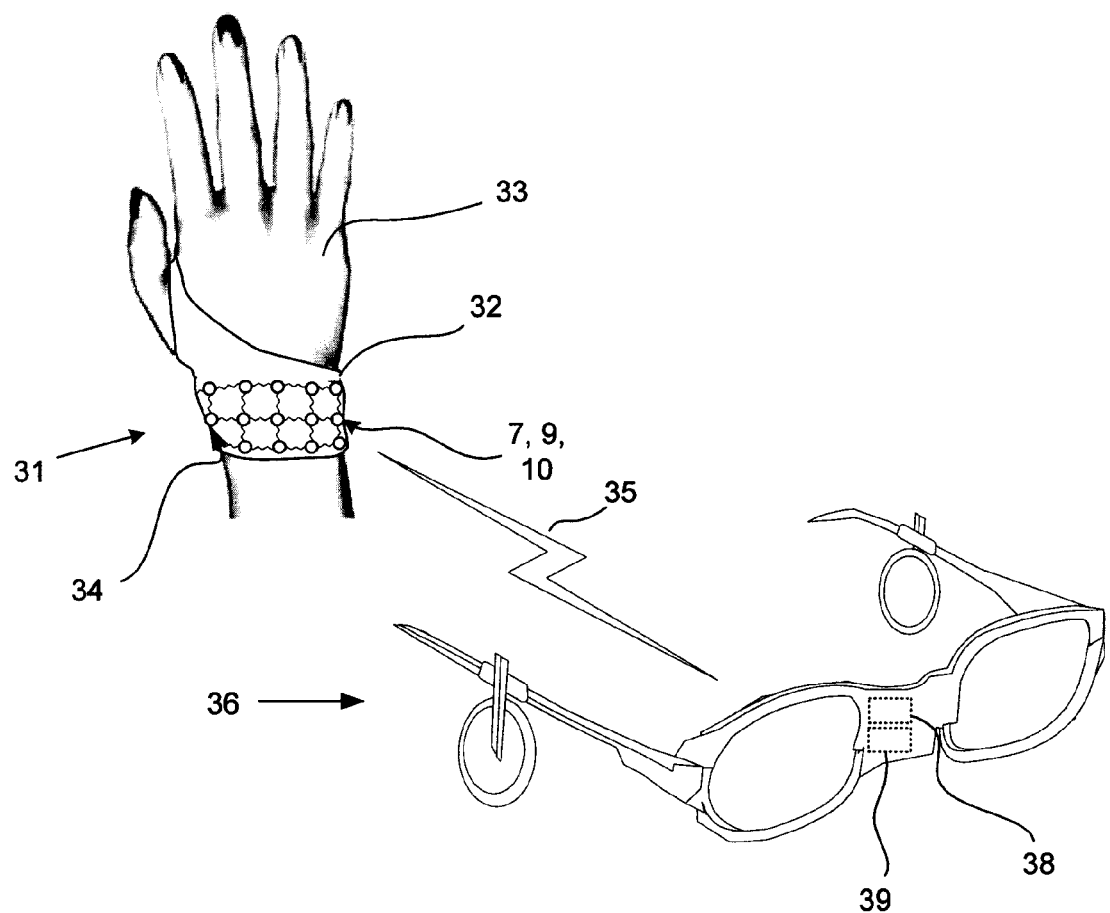
FIG. 11 is depicts an arrangement comprising an apparatus according to a second embodiment of the invention.
Figure 12A:
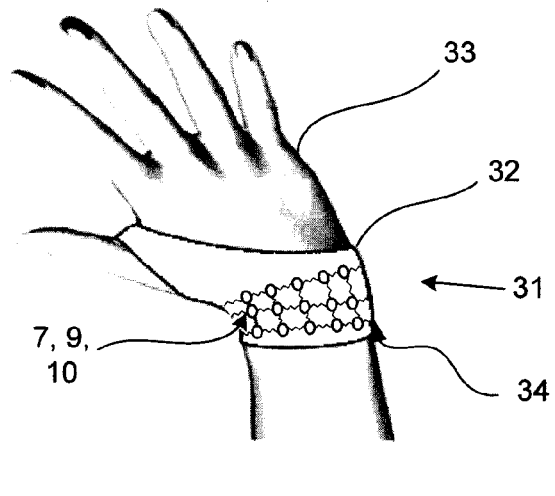
FIGS. 12a to 12d depict the apparatus shown in FIG. 11 when conforming to a number of positions of a user's hand.
Figure 12B:
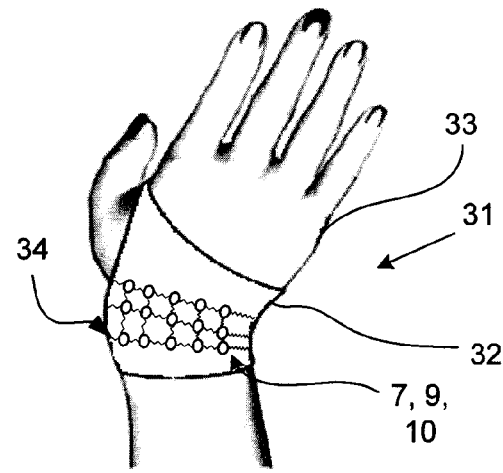
Figure 12C:
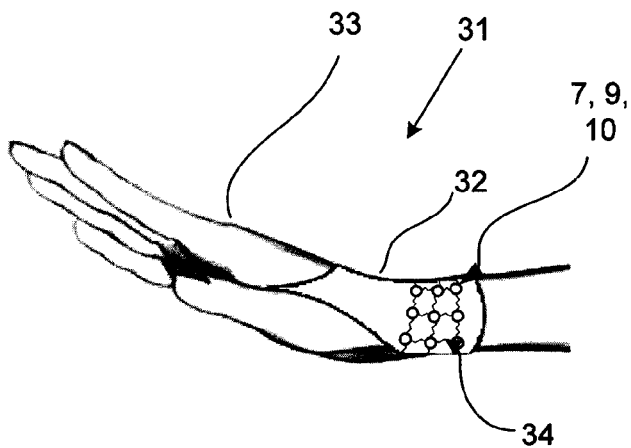
Figure 12D:
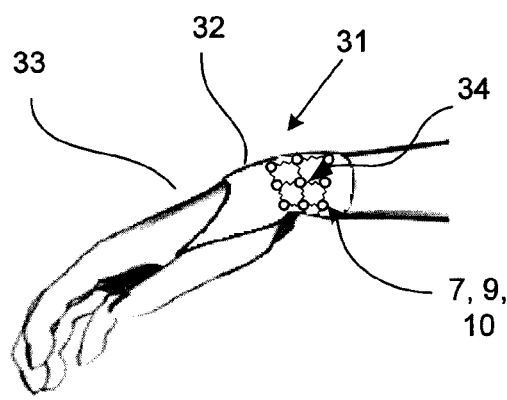

Distributed neural network arrangements such as that discussed hereinabove can be used to detect deformation in a number of other devices. For instance, FIG. 11 depicts a wearable apparatus 31. The apparatus 31 comprises a sleeve 32, arranged to be worn over the hand 33 of a user.

The sleeve 32 is arranged to conform with stretching and relaxation of the skin of the user's wrist 34 and so is capable of undergoing resiliently deformations along arbitrary directions. In this particular example, the sleeve 32 comprises a substrate formed from a soft, conformable material, such as natural rubber, silicone rubber, another elastomer or elastomer-like material, capable of tolerating a strain of around 20%.

A network of detection modules 7 and processing circuits 9, 10 is embedded in the sleeve 32, in a similar manner to that described above in relation to the apparatus 1 of FIGS. 1a and 1b. The detection modules 7 comprise sensors 8 for monitoring stretching and/or flexing of the sleeve 32 as it conforms to movements of the user's wrist 34, for instance, when moving between a rest position, shown in FIG. 11, to one of the other postures shown in FIGS. 12a to 12d.

In the arrangement shown in FIG. 11, the apparatus 31 is arranged to act as a user interface, so that a user can remotely control a remote device via a wireless communications link 35. In this particular example, the remote device is a headmounted display 36 and the movements of the user's wrist 34 shown in FIGS. 12a to 12d cause an image output by the headmounted display 36 to be scrolled to the left, right, up and down respectively.

Figure 13:
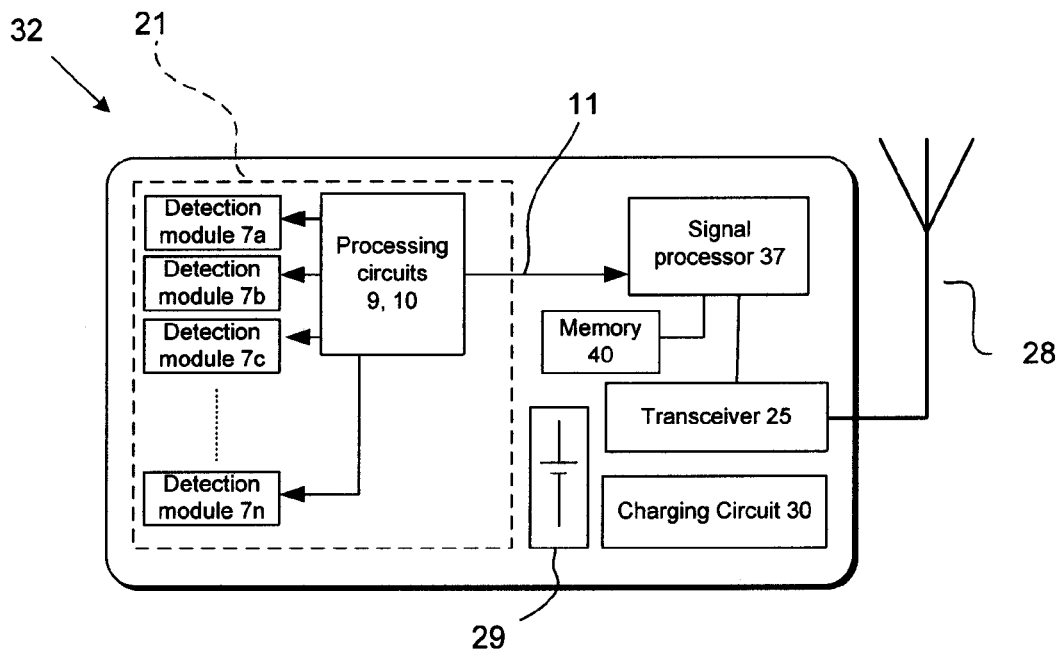
FIG. 13 is a block diagram of the apparatus shown in FIG. 11.

FIG. 13 is a block diagram of the apparatus 31, in which components similar to those discussed in relation to the first embodiment are referred to by the same reference numerals. The apparatus 31 is equipped with a distributed neural network, which includes a plurality of detection modules 7 and processing circuits 9, 10, as described hereinabove in relation to the apparatus 1 of FIGS. 1a and 1b. The signals output and processed by the detection modules 7 are processed by the processing circuits 9, 10. A combination signal can then be generated and processed by a processor 37, based on the signals from two or more of the detection modules 7, for transmission to the display 36 via the transceiver 25 and antenna 28.

The combination signal may identify at least the major features of the shape of the sleeve 32 and, therefore, the posture of all or part of the user's wrist 34. A processor 38 within the display 36 can then map a command signal onto the determined deformation, for example, by using a look-up table stored in a memory 39.

Alternatively, the processor 33 of the apparatus 31 may be arranged to identify the posture of the user's wrist 34 using a look-up table stored in a memory 40. In such an arrangement, the combination signal transmitted by the apparatus 31 to the display 32 may be the command signal itself.

Alternatively, or additionally, the memory 40 of the apparatus 31 may store information about shape of the sleeve 32 or determined postures so that the processor 37 can compare a current shape or posture with stored information, identify changes in the shape of the sleeve 32 and determine a movement of the user's hand 30 or wrist 34. In such an embodiment, the signal transmitted to the display 36 may be a signal identifying that movement or, alternatively, a corresponding command signal based thereon.

In this manner, a remote device, such as the display 36 can be controlled by the user's movements instead of, or as well as, the posture of a part of the user's body 33, 34.

In other words, the neural network 21 can classify and recognize the configuration of the apparatus 31, identify any conformal transformation and, if required, to determine the dynamics of such a transformation. The apparatus 31 is thus arranged to output a combination signal that relates to the output of multiple ones of the detection modules 7. Such an arrangement can reduce, or even minimize, the number of output signals to be conveyed to a remote device, thereby reducing the amount of data to be transmitted and, potentially, improving the speed with which a receiving device can respond to user input. Depending on the configuration of the apparatus 31 and remote device, the need for additional computing resources in the remote device can be reduced.

Figures 14, 15:
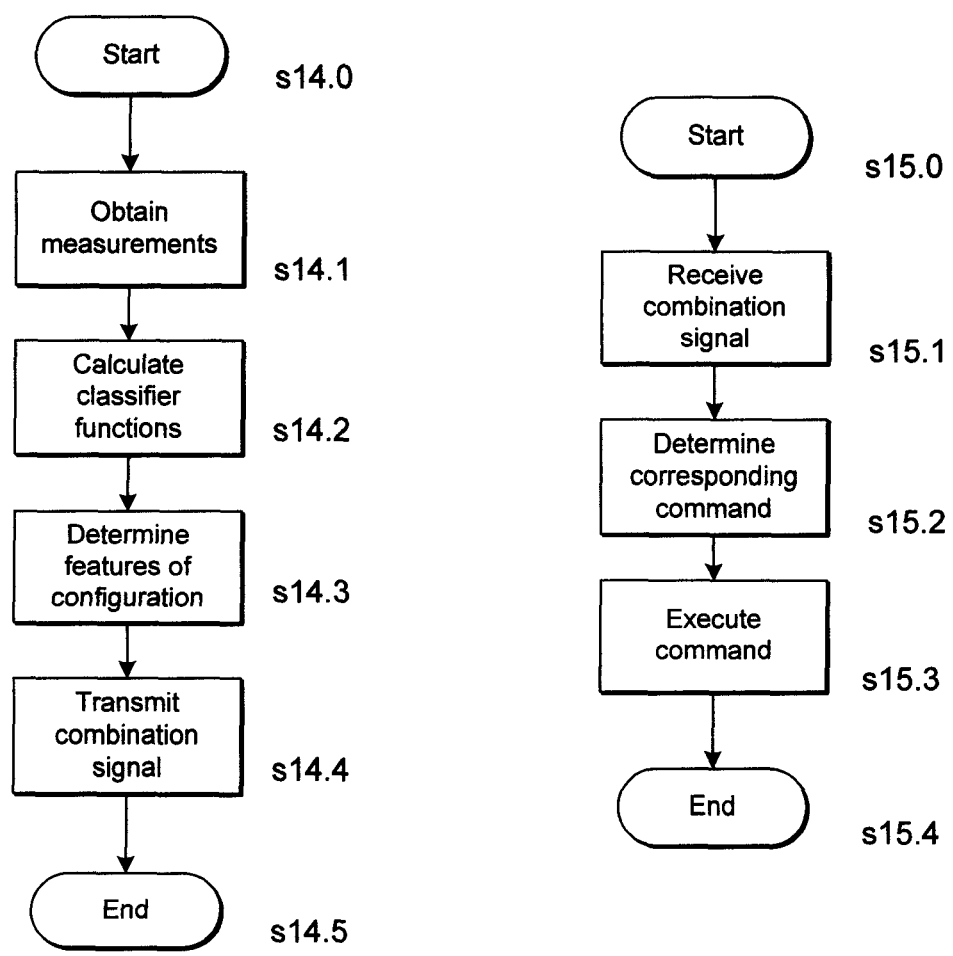
FIG. 14 is a flowchart of a method performed by the apparatus shown in FIG. 11.
FIG. 15 is a flowchart of a method performed by a device controlled by the apparatus shown in FIG. 11.

FIGS. 14 and 15 are flowcharts of examples of methods that can be performed by the apparatus 31 and the remote device, display 36, respectively.

Starting at step s14.0, measurements of localised deformations are obtained by the sensors 8 of the detection modules 7 (step s14.1). The processing circuits 9, 10 of the neural network 21 then calculates classifier functions based on the measurements (step s14.2), as described above in relation to the apparatus 1 of the first embodiment. A combination signal, including one or more outputs characterising the features of at least a local configuration of the apparatus 31 are generated by the processing circuits 9, 10 and/or the processor 37 (step s14.3) and transmitted to the display 36 (step s14.4), completing the process (step s14.5).

Turning now to the display 36 and starting at step s15.0, the combination signal from the apparatus 31 is received by the display 36 (step s15.1) and a corresponding command is determined (step s15.2). The relevant command is then executed (step s15.3). For example, where the deformation of the apparatus 31 indicates that a user wishes to scroll an image presented by the display 36, that image is updated accordingly. Where the remote device is a different type of device, such as a home appliance, tv or computer, the execution of the relevant command may include changing the functionality of the remote device, moving a cursor on a display, calling up a menu and so on. The process is then complete (step s15.4).

As noted above, the apparatus 31 may be configured to determine the command corresponding to the configuration, (step s14.2) and, in step s14.4, to transmit a corresponding command signal in place of the corresponding signal for reception by the display 36 in step s15.1.

Figure 16:
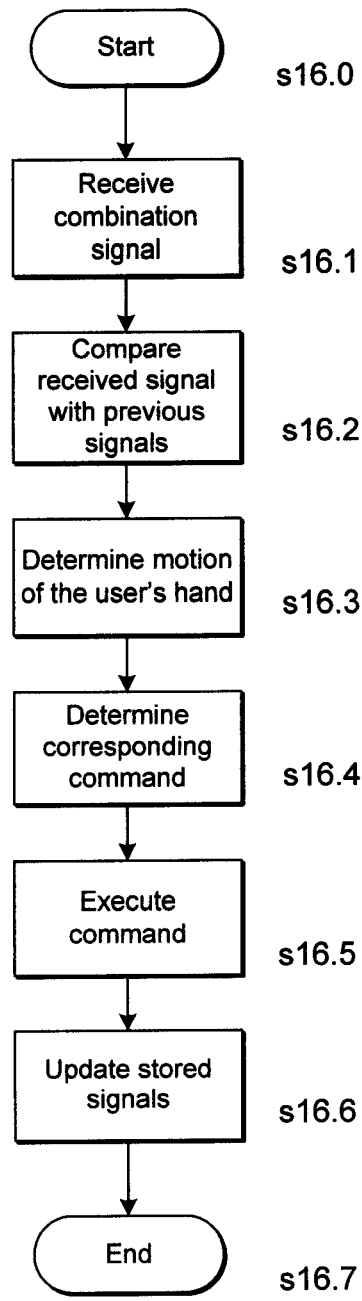
FIG. 16 is a flowchart of an alternative method performed by a device controlled by the apparatus shown in FIG. 11.

FIG. 16 depicts a method performed by the display 36 in place of the method of FIG. 15, when controlled by movement of the user's hand 33 or wrist 34.

Starting at step s16.0, the combination signal from the apparatus 31 is received (step s16.1) and compared with previously received signals stored in the memory 39 of the display 36 (step s16.2). The movement of the user's hand 33 or wrist 34 is determined, based on differences between the received signal and one or more stored signals (step s16.3). A command corresponding to that movement is identified (step s16.4) and executed by the display 36 (step s16.5), as described above in relation to step s15.3 of FIG. 15. The most recently received signal is then stored in the memory 39 (step s16.6) for comparison with subsequent combination signals and the process ends (step s16.7).

As noted above, in other embodiments of the invention, steps s16.2, 16.3 and, optionally, step s16.4 may be performed by the apparatus 31 and a signal identifying the movement or the corresponding command signal may be transmitted to the remote device in place of the combination signal.

While the sleeve 32 of the apparatus 31 of FIGS. 11 and 12 is configured to fit over a user's hand 33 and to detect the shape of at least part of the sleeve 32 to identify a posture and/or motion of the user's wrist 34, other embodiments of the invention may comprise one or more deformable sleeves, substrates or surfaces in other forms, depending on the particular application of the apparatus. For instance, a wearable apparatus that acts as a user interface or a detector for monitoring a body part of a user in a remote presence, or telepresence, arrangement may include a sleeve configured to fit over a particular part of a user's body.

Furthermore, FIGS. 11 and 12 depict an apparatus 31 in which the detection modules 7 and processing circuits 9, 10 are arranged in a uniform distribution around the user's wrist 34. However, in other embodiments of the invention, more or fewer detection modules 7 and processing circuits 9, 10 may be provided, and arranged in other manners.

Figure 17:
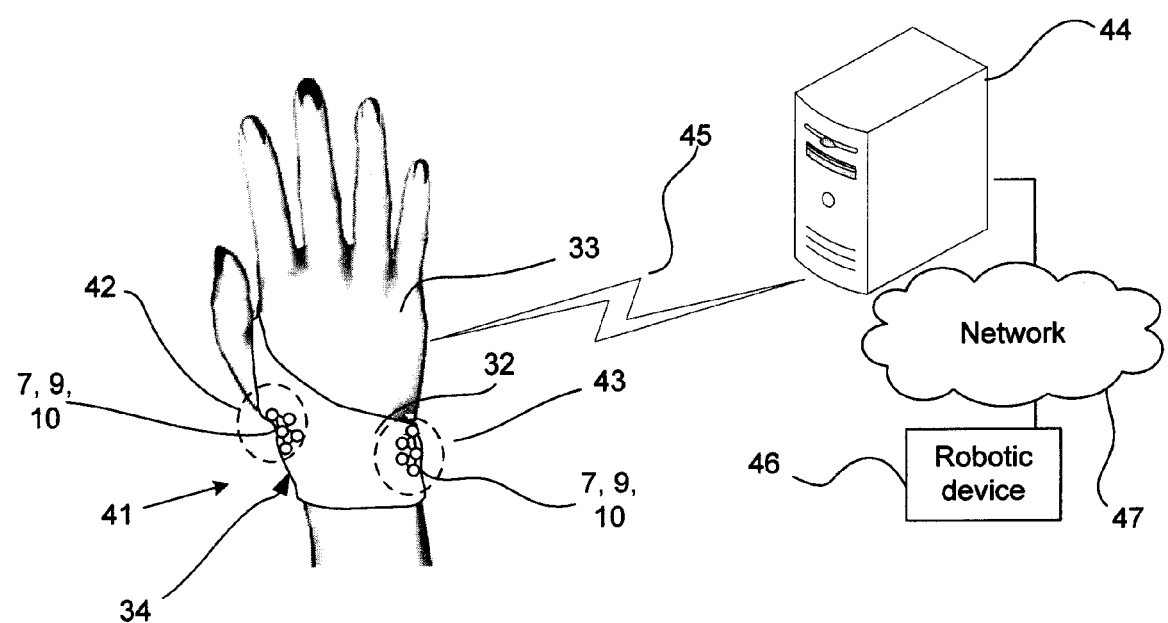
FIG. 17 depicts a system including an apparatus according to a third embodiment of the invention.

For instance, FIG. 17 depicts an apparatus 41 according to a third embodiment of the invention, in which the spatial distribution of detection modules 7 and processing circuits 9, 10 is concentrated in particular areas 42, 43 of the sleeve 32. In this particular example, the areas 42, 43 correspond to points where a relatively high level of local deformation may be experienced. Such an arrangement can permit the shape of the deformation to be determined with greater precision, by making a relatively high number of measurements in regions where most of the deformation is expected. In other words, the concentration of detection modules 7 in the sleeve 32 can be varied from area to area to allow for localised high resolution tracking capabilities.

In the example shown in FIG. 17, the apparatus 41 generates a combination signal based on the deformation of the sleeve 32 as it conforms to the user's hand 33 and wrist 34, as described previously with reference to FIG. 14, steps s14.0 to s14.5. In this particular example, the combination signal is transmitted to a computer 44 via a wireless link 45. The computer 44 is arranged to reconstruct the movement of the user's wrist 34 based as described previously with reference to FIG. 15, steps s15.0 to s15.4. In this particular example, the computer 44 is arranged to steer a robotic device 46 that replicates the movements of the user's wrist 34. The command signal generated at step s15.2 may thus be a command signal that controls movement of a component of the robotic device 46. The command signal may be transmitted to the robotic device 46, via a network 47. The robotic device 46 then executes the received command (step s15.3). As the deformation of the sleeve 32 and, thus, the posture and/or movement of the user's wrist 34 can be mapped and monitored with high precision by the apparatus 41, the system of FIG. 17 may be particularly suitable for teleoperation of the robotic device 46 in applications requiring the replication of delicate movements. For instance, the robotic device 46 a remote device containing an array of actuators arranged to perform object movement in accordance with an initial transformation and the received combined signal, to provide remotely controlled object manipulation.

Alternatively, or additionally, such an arrangement can permit the measurements to be concentrated in such a region so that the deformation can be monitored using fewer detection modules 7 and processing circuits 9, 10, potentially reducing complexity, power consumption and manufacturing costs.

While the apparatuses 31, 41 shown in FIGS. 11 and 17 are intended for controlling a display 36 and a robotic device 46 respectively, the apparatuses 31, 41 or apparatuses similar thereto, may be used to control other types of remote device. For instance, the apparatuses 31, 41 could be used to move a cursor on a display associated with a personal computer, to change channels and/or control volume, brightness and contrast on a television or to control a home appliance. In such devices, the methods of FIGS. 15 and 16 may be performed by the remote device.

In yet another embodiment, the apparatus 31, 41 may be used to monitor the posture and/or movements of the user and to transmit the combination signal to a remote device, such as a computer 44, for storage and/or analysis.

Figure 18:
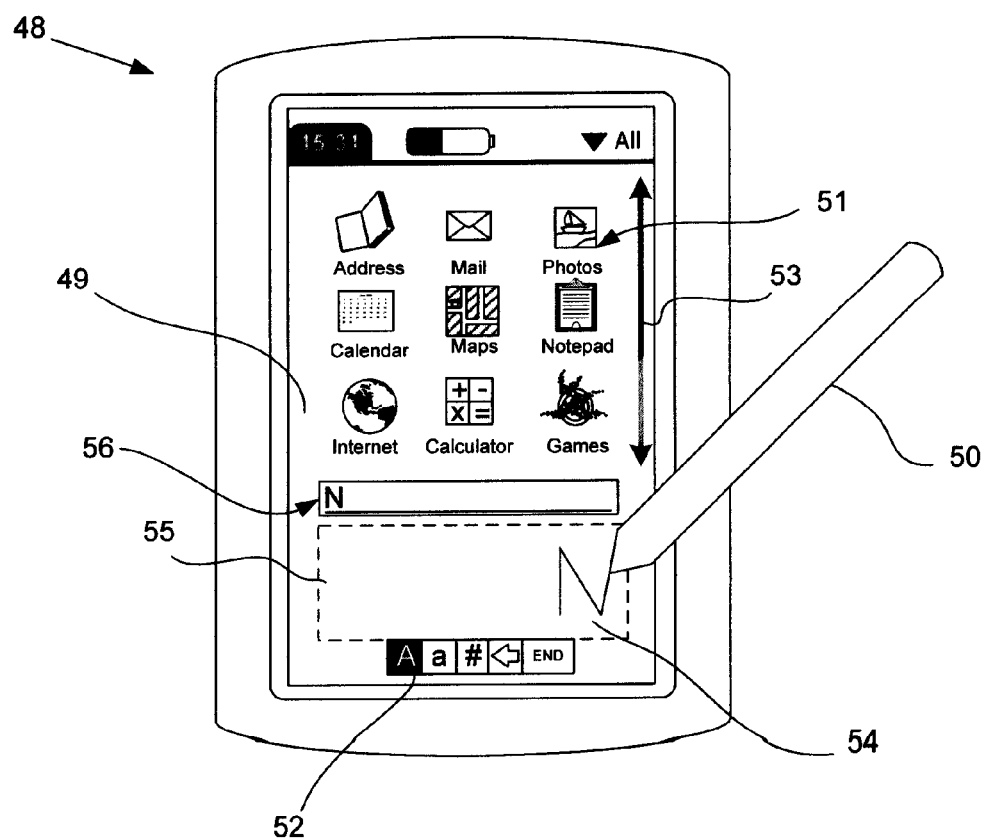
FIG. 18 depicts an apparatus according to a fourth embodiment of the invention.

FIG. 18 depicts an example of an apparatus 48 according to another embodiment of the invention, in the form of a personal digital assistant device. In the apparatus 48, a network 21 of detection modules 7 and processing circuits 9, 10, as described above, is utilized to provide a touch sensitive user interface 49, or touch screen, through which a user can control processes such as browsing of content and services, requesting and selecting items from pop-up menus displayed thereon.

The touch screen 49 includes a resiliently deformable surface in which a distributed network of sensors 8 and processing circuits 9, 10 are provided, as described above in relation to the apparatus 1 of FIG. 1.

In this particular example, a user can input information using a stylus 50 or their fingers (not shown) to exert pressure on a particular area of the touch screen 49 to select an icon 51 associated with an application or a function button 52 or to operate a scroll bar 53. The configuration of the apparatus otherwise resembles that shown in the block diagram of FIG. 9, with the detection modules 7 sensing localised deformation of the touch screen 49 in the area pressed by the user and producing one or more output signals for transmission to an application processor 16.

Alternatively, the apparatus 48 may be configured as shown in FIG. 13 and arranged to transmit a combination signal and/or a command signal to a remote device, such as a mobile terminal, personal computer, home appliance and so on.

The apparatus 48 may be equipped with a handwriting recognition function, so that a symbol 54 input in at least a particular region 55 of the touch-screen 49 can be identified.

Figure 19:
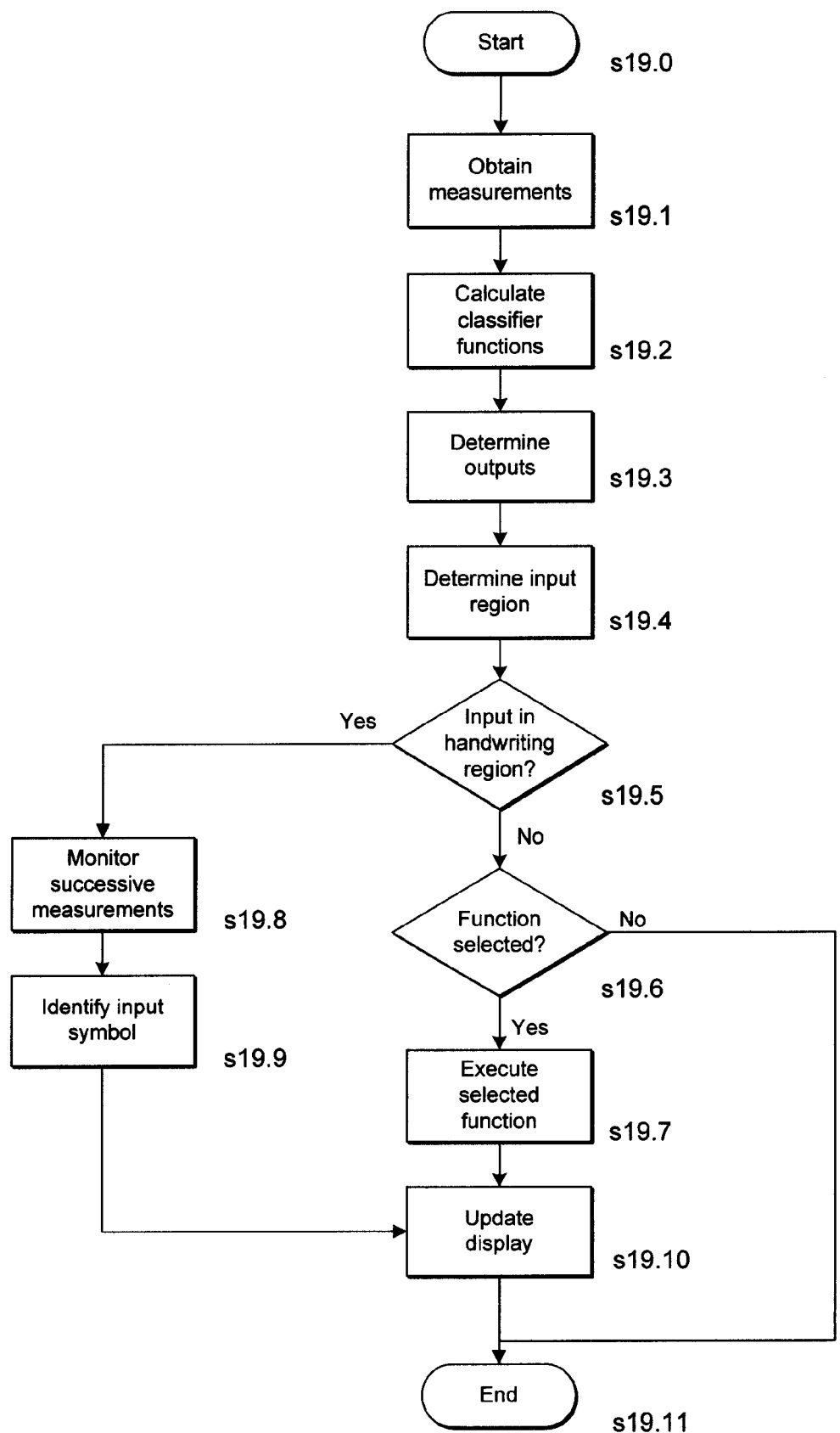
FIG. 19 is a flowchart of a method performed by the apparatus of FIG. 18.

FIG. 19 depicts a method performed by the apparatus 48 of FIG. 18. Starting at step s19.0, measurements of localised deformation are obtained from some or all of the detection modules 7 (step s19.1). Classifier functions and outputs are determined by processing circuits 9, 10, as described above in relation to FIG. 5 (steps s19.2, s19.3). The region of the touch-screen 49 in which the user input was received is determined (step s19.4) by the application processor 16.

If the user input was made outside the handwriting recognition region 55, the application processor 16 determines whether a function has been selected (step s19.6), for example, by the user pressing on an icon 51, button 52 or bar 53. If so, the selected function is executed (step s19.7).

If it is determined that the user input was made within the handwriting region 55 (step s19.5), successive measurements from the detection modules 7 are monitored and compared, for example, using a method similar to that described in relation to steps s16.2, s16.3 and s16.6 of FIG. 16 (step s19.8), to build up a record of the user's movements and, therefore, the gesture made by the user. This record is then compared with reference data stored in a memory 18 in order to identify the symbol input by the user (step s19.9) and, where necessary, to store it for use in an appropriate application. The symbol may be an alphabetic character, numeral or punctuation mark.

The display is then updated (step s19.10). In the case where a selected function has been executed, the display is updated to show a corresponding user interface and/or to show that the function has been activated. Where a user has input a symbol, the identified symbol 56 may be displayed on the touch screen 49 so that the user can verify it. The procedure is then complete (step s19.11).

The embodiments described above represent examples of apparatuses and systems in which a distributed network of sensors 8 and processing circuits 9, 10 can be used to detect deformation. Such a network can be used in other apparatuses and/or systems. For instance, such a network can be used to monitor the shape of a deformable surface, such as the substrate 2 of the apparatus 1, in order to determine a command to be carried out by a remote device 36. In this manner, a user can manipulate the deformable surface into a particular shape, or into one of a set of predetermined shapes, in order to control a function on a remote device. In such an apparatus, the deformable surface may be provided in close proximity to the user, for example, in a wearable device.

Figure 20:
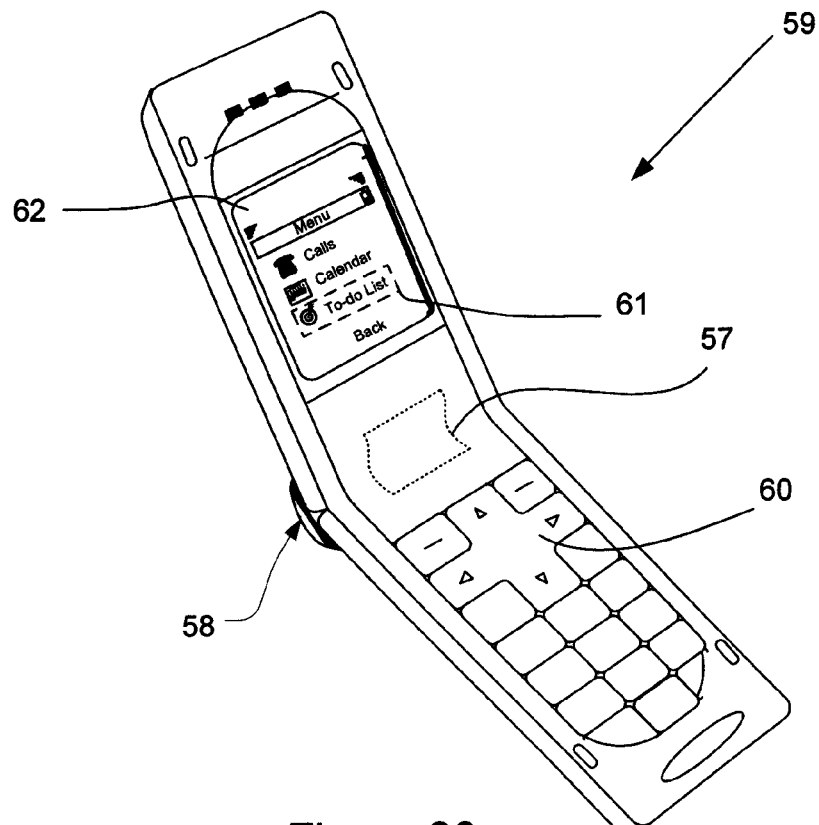
FIG. 20 depicts a mobile telecommunications device including an apparatus according to fifth embodiment of the invention.

In another arrangement, such an apparatus could be a component of, or attached to, another object. For instance, such an apparatus 57 could be included within the hinge 58 of a foldable, or "clamshell", mobile telecommunications device 59, as shown in FIG. 20. In other embodiments, the apparatus 57 may itself form the hinge 58.

In this particular example, the apparatus 57 includes a layer of deformable material in which a network of sensors 8 and processing circuits 9, 10 are provided. The configuration of the apparatus may depend on whether the mobile device 59 is in an "open" or "closed" configuration. The output from the sensors 8 of the apparatus 57 can then be used to provide different functionality depending on whether the mobile device 59 is open or closed, in a similar manner to that depicted in FIG. 9. Alternatively, or additionally, a further apparatus 60 could be provided on, or form part of, a part of the mobile telecommunications device 59 or its chassis. In this particular example, the further apparatus 60 is arranged to be manipulated by the user, for instance, to manipulate a cursor or focus region 61 on a display 62 of the mobile telecommunications device 59.

Although the device shown in FIG. 20 is a mobile telecommunications device 59, a similar apparatus could be provided within, or even form, the hinge of another type of folding electronic device. For example, the apparatus 57 could be provided in a laptop computer, in order to change properties such as brightness or contrast of a displayed image according to an angle of a screen relative to a keyboard.

In the embodiment shown in FIG. 20, a deformable structure forms part of a larger device. Such a deformable structure may be provided as part of a surface or as a projection from a surface of a larger device in other embodiments of the invention.

Figure 21:
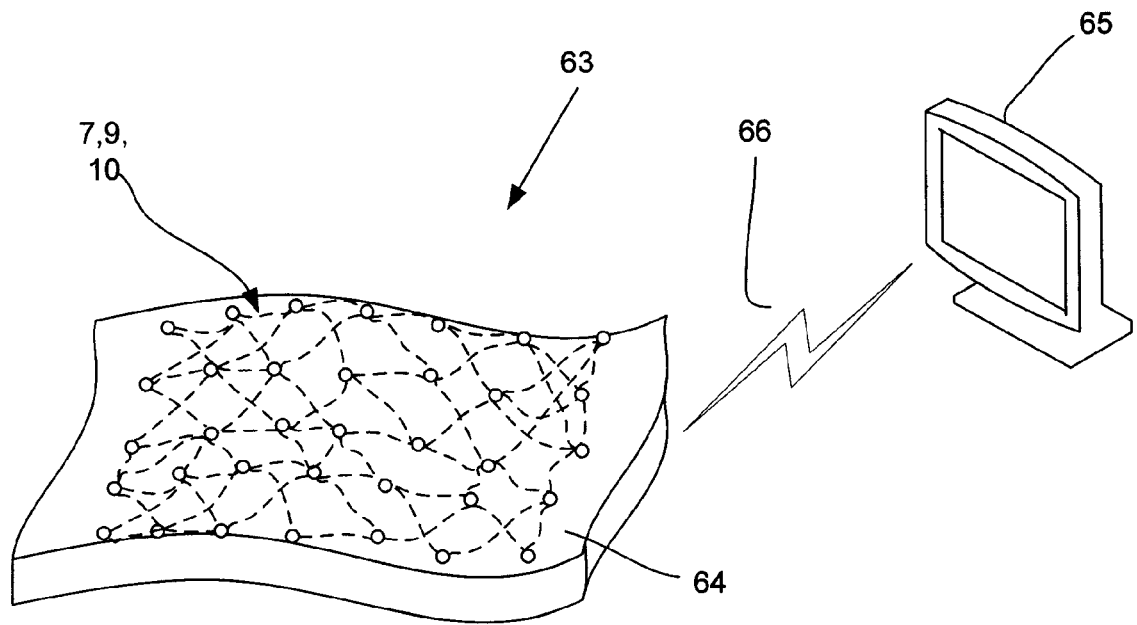
FIG. 21 depicts an apparatus according to a sixth embodiment of the invention.

Alternatively, the primary deformable surface of the apparatus may be an independent object. FIG. 21 shows an example apparatus 63, comprising a resiliently deformable substrate 64. In this particular example, the substrate 64 is in the form of a layer of material, however, such an apparatus can be provided in other forms. For instance, the apparatus 63 could take the form of another three-dimensional object, such as a strip, a ball, a cube, and so on. A network of detection modules 7 and processing circuits 9, 10 is distributed in the substrate 64, along with the other components shown in FIG. 13. Examples of suitable materials for the substrate 64, sensors 8 and processing circuits 9, 10 include those discussed above in relation to the flexible substrate, sensors 8 and processing circuits 9, 10 of the apparatus 1, shown in FIGS. 1a and 1b.

A user can manipulate the apparatus 63 to change its shape. The localised deformations resulting from such shape changes are detected by the sensors 8 and characterized by the processing circuits 9, 10, and a combination signal identifying the transformation and/or a command signal can be transmitted to a remote device 65 via a wireless link 66, as described above with reference to FIG. 14. In this particular example, the apparatus 63 is used as a remote control for a television 65. However, in other embodiments, such an apparatus could be used in a telepresence application, where the combination signal is copied to a remote device arranged to replicate or reconstruct the shape of the apparatus 63, in a similar manner to that described in relation to the robotic device 46 of FIG. 17.

It will be appreciated that many modifications can be made to the embodiments hereinbefore described without departing from the spirit and scope of the invention, including any novel features or any novel combination of features disclosed herein either explicitly or implicitly or any generalization thereof.

What is claimed is:

1. An apparatus comprising:
   a deformable structure, wherein the deformable structure is configured to be worn over a body part; and
   a network including a plurality of sensors arranged to monitor deformation of the deformable structure and a plurality of processing circuits configured to generate a signal characterizing features of said deformation, based on the output of two or more of said sensors;
   wherein said processing circuits are distributed amongst said plurality of sensors,
   wherein said processing circuits are configured to transmit signals using one of pulse width modulation, pulse density modulation, pulse train frequency modulation, or spike code modulation,
   wherein at least some of said sensors comprise piezoelectric material,
   wherein said piezoelectric material comprises a plurality of nanowires,
   wherein at least some of said sensors comprise a material that changes its capacitance when stretched,
   wherein at least some of said sensors are configured to monitor localized charges generated in response to stretching along first and second directions and the first and second directions are substantially perpendicular to one another, and
   in an instance the generated charges exceed a predetermined threshold, wherein at least some of said sensors are configured to cause an output to be transmitted to the processing circuits.

2. The apparatus according to claim 1, wherein said network is a neural network.

3. The apparatus according to claim 1, wherein the deformable structure is arranged to be formed into two or more predetermined shapes, comprising an electronic device, configured to provide access to a first function of the electronic device when the deformable structure has a first one of said predetermined shapes and to provide access to a second function of the electronic device when the deformable structure is in a second one of said predetermined shapes.

4. The apparatus according to claim 1, configured to output a command signal corresponding to a shape of at least part of the deformable structure.

5. The apparatus according to claim 4, arranged to transmit the command signal to a remote device.

6. The apparatus according to claim 1, configured to output a command signal corresponding to a change in a shape of at least part of the deformable structure.

7. The apparatus according to claim 6, arranged to transmit the command signal to a remote device.

8. The apparatus according to claim 1, wherein at least some of said sensors comprise a material that changes its resistivity when stretched.

9. The apparatus according to claim 1, wherein said sensors comprise a plurality of sensing elements, wherein each sensing element is configured to monitor stretching and flexure of at least part of the deformable structure.

10. The apparatus according to claim 9, wherein first and second ones of said plurality of sensing elements are arranged to monitor said stretching along first and second directions respectively, wherein the first direction is different from the second direction.

11. A mobile telecommunications device comprising an apparatus according to claim 1.

12. A foldable electronic device comprising an apparatus according to claim 1, comprising a hinge, wherein said deformable structure is located in a hinge.

13. A foldable electronic device comprising an apparatus according to claim 1, wherein said deformable structure is provided in the form a hinge.

14. A portable computing device comprising an apparatus according to claim 1.

15. A system comprising:
a first apparatus according to claim 1, arranged to transmit a signal corresponding to said identified features to a remote apparatus; and
a second apparatus configured to receive said signal from said first apparatus.

16. The system according to claim 15, wherein said second apparatus is arranged to be controlled according to the signal received from said first apparatus.

17. The system according to claim 15, wherein said second apparatus is arranged to replicate a shape corresponding to the deformation of said at least part of the deformable structure.

18. The system according to claim 15, wherein said second apparatus is arranged to replicate a movement corresponding to successive deformations of said at least part of the deformable structure.

19. An apparatus comprising:
a deformable structure, wherein the deformable structure is configured to be worn over a body part;
a plurality of sensors for monitoring deformation of the deformable structure and
a plurality of processing circuits for generating a signal characterizing features of said deformation, based on the output of two or more of said sensors;
wherein said processing circuits are distributed amongst said plurality of sensors,
wherein said processing circuits are configured to transmit signals using one of pulse width modulation, pulse density modulation, pulse train frequency modulation, or spike code modulation,
wherein at least some of said sensors comprise piezoelectric material,
wherein said piezoelectric material comprises a plurality of nanowires,
wherein at least some of said sensors comprise a material that changes its capacitance when stretched,
wherein at least some of said sensors are configured to monitor localized charges generated in response to stretching along first and second directions and the first and second directions are substantially perpendicular to one another, and
in an instance the generated charges exceed a predetermined threshold, at least some of said sensors are configured to cause an output to be transmitted to the processing circuits.

20. A method comprising:
obtaining a plurality of measurements of deformations from a plurality of respective sensors distributed within a deformable structure, wherein the deformable structure is configured to be worn over a body part;
generating a signal identifying one or more features of said deformation based on two or more of said measurements; and
transmitting said signal using one of pulse width modulation, pulse density modulation, pulse train frequency modulation, or spike code modulation;
wherein said generation of the signal comprises processing said two or more measurements using a plurality of processing circuits distributed amongst said sensors,
wherein at least some of said sensors comprise piezoelectric material,
wherein said piezoelectric material comprises a plurality of nanowires,
wherein at least some of said sensors comprise a material that changes its capacitance when stretched,
wherein at least some of said sensors are configured to monitor localized charges generated in response to stretching along first and second directions and the first and second directions are substantially perpendicular to one another, and
in an instance the generated charges exceed a predetermined threshold, at least some of the sensors are configured to cause an output to be transmitted to the processing circuits.

21. The method according to claim 20, comprising:
comparing said generated signal with previous signals to determine time-based changes in a shape of said deformable structure.

22. The method according to claim 20, comprising:
said generating comprises comparing said generated signal with reference data in order to identify said one or more features.

23. The method according to claim 22, comprising:
updating at least one of the reference signals in accordance with said generated signal.

24. The method according to claim 20, comprising:
mapping a command onto said generated signal.

25. The method according to claim 20, comprising:
comparing said time-based changes with reference data to identify a movement corresponding to said time-based changes.

26. The method according to claim 25, comprising mapping a command onto said time-based changes.

27. The method according to claim 25, comprising:
updating said reference data in accordance with the comparison of the generated signal with previously generated signals.

28. The method according to claim 25, comprising:
transmitting a signal corresponding to the identified movement to a remote device.

29. The method according to claim 28, comprising causing said remote device to replicate said movement.

30. The method according to claim 20, comprising:
adjusting the availability of one or more functions available to a user of a device according to said generated signal.

31. The method according to claim 20, comprising:
 transmitting a signal corresponding to said features to a remote device.

32. The method according to claim 31, comprising causing said remote device to replicate a shape in accordance with said features.

\* \* \* \* \*